United States Patent
Jang

(10) Patent No.: US 9,090,166 B2
(45) Date of Patent: Jul. 28, 2015

(54) METHOD OF MANAGING PROGRAM FOR ELECTRIC VEHICLE

(71) Applicant: LSIS CO., LTD., Anyang-si, Gyeonggi-do (KR)

(72) Inventor: Sung Jin Jang, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 106 days.

(21) Appl. No.: 13/681,352

(22) Filed: Nov. 19, 2012

(65) Prior Publication Data

US 2013/0138675 A1 May 30, 2013

(30) Foreign Application Priority Data

Nov. 25, 2011 (KR) ........................ 10-2011-0124324

(51) Int. Cl.
| | |
|---|---|
| *G06F 17/30* | (2006.01) |
| *B60L 15/00* | (2006.01) |
| *B60L 3/12* | (2006.01) |
| *B60L 7/26* | (2006.01) |
| *B60L 8/00* | (2006.01) |
| *B60L 11/00* | (2006.01) |
| *B60L 11/18* | (2006.01) |

(52) U.S. Cl.
CPC . *B60L 15/00* (2013.01); *B60L 3/12* (2013.01); *B60L 7/26* (2013.01); *B60L 8/003* (2013.01); *B60L 11/007* (2013.01); *B60L 11/18* (2013.01); *B60L 2200/12* (2013.01); *Y02T 10/7005* (2013.01); *Y02T 10/7083* (2013.01)

(58) Field of Classification Search
CPC ......... G06F 8/65; G06F 1/26; G06F 17/5009; G06F 19/322; G06F 19/323; G06F 19/3418; G06F 1/28; G06F 21/6227; G06F 8/60
USPC ............ 707/600–831, 899, 999.001–999.206
See application file for complete search history.

(56) References Cited

U.S. PATENT DOCUMENTS

| | | | | |
|---|---|---|---|---|
| 6,148,258 | A * | 11/2000 | Boisvert et al. ................. | 701/99 |
| 7,004,273 | B1 * | 2/2006 | Gruenwald et al. ..... | 180/65.245 |
| 7,813,822 | B1 * | 10/2010 | Hoffberg ........................ | 700/94 |
| 8,135,533 | B2 * | 3/2012 | Noda ............................ | 701/102 |
| 2009/0150599 | A1 * | 6/2009 | Bennett ........................ | 711/103 |
| 2010/0049610 | A1 * | 2/2010 | Ambrosio et al. ......... | 705/14.62 |
| 2011/0119075 | A1 * | 5/2011 | Dhoble ............................. | 705/2 |
| 2011/0191522 | A1 * | 8/2011 | Condict et al. ................ | 711/103 |
| 2011/0280447 | A1 * | 11/2011 | Conwell ....................... | 382/103 |

FOREIGN PATENT DOCUMENTS

| | | |
|---|---|---|
| JP | 05307471 | 11/1993 |
| JP | 2001073864 | 3/2001 |
| JP | 2002149412 | 5/2002 |
| JP | 2004040649 | 2/2004 |

OTHER PUBLICATIONS

Japan Patent Office Application Serial No. 2012-256536, Office Action dated Nov. 12, 2013, 3 pages.

* cited by examiner

*Primary Examiner* — Angelica Ruiz
(74) *Attorney, Agent, or Firm* — Lee, Hong, Degerman, Kang & Waimey

(57) ABSTRACT

Provided is a method of managing a program for an electric vehicle. The method of managing the program for the electric vehicle include reading metadata of an operating program for an electronic subassembly equipped in an electric vehicle, reading metadata of a parameter corresponding to the operating program, comparing the metadata of the operating program with the metadata of the parameter, and updating the parameter or executing the operating program according to comparison results.

10 Claims, 2 Drawing Sheets

METHOD OF MANAGING PROGRAM FOR ELECTRIC VEHICLE

CROSS-REFERENCE TO RELATED APPLICATIONS

Pursuant to 35 U.S.C. §119(a), this application claims the benefit of earlier filing date and right of priority to Korean Patent Application No. 10-2011-0124324, filed on Nov. 25, 2011, the contents of which are hereby incorporated by reference herein in their entirety.

BACKGROUND

The present disclosure relates to an electric vehicle, and more particularly, to a method of managing a program for an electric vehicle.

To solve problems such as air pollution, and the increase of $CO_2$ emission, current research interests are focused on the development of an electric vehicle (EV) which is powered by electricity originally generated from an electric drive motor with no emission gas, or a hybrid electric vehicle (HEV) which is powered by an engine and an electric drive motor.

Typically, electric vehicles are provided with a battery, an inverter, a motor, a transmission, and the like. Electric energy powered from an external power source is stored in the battery, and the inverter is supplied with the electric energy from the battery to control the motor at a desired torque and velocity. Mechanical force transferred through the transmission mechanically connected with the motor rotates wheels to drive the electric vehicle.

Besides, an assembly of various electronic devices, i.e., an electronic sub assembly (ESA) is equipped in the electric vehicle. ESA is provided with various devices such as an essential device for driving the electric vehicle, and a device for convenience of users, and typically operates in combination of hardware devices and software programs. A software program is executed with reference to a plurality of parameters, which include a plurality of set values that are operation reference values for optimal operation of the corresponding ESA.

Meanwhile, for improvement, change, and the like of functions in ESA, a software program for operating ESA is corrected, changed, and continuously updated to the electric vehicle. In spite that the correction and change of the software program are mostly accompanied by the change of parameters, it is general that only the software program is updated and the parameters are not updated. Thus, since the software program is executed with reference to maladapted parameters, frequent error is generated in the course of operating ESA and thus the reliability of the software program is lowered.

SUMMARY

Embodiments provide a method of managing a program for an electric vehicle that can automatically update parameters corresponding to an operating program for an electronic subassembly.

In one embodiment, a method of managing a program for an electric vehicle includes: reading metadata of an operating program for an electronic subassembly equipped in the electric vehicle; reading metadata of a parameter corresponding to the operating program; comparing the metadata of the operating program with the metadata of the parameter; and updating the parameter or executing the operating program according to comparison results.

The updating of the parameter or executing of the operating program according to the comparison results may correspond to, when the metadata of the program accords with the metadata of the parameter, the executing of the operating program, and when the metadata of the program does not accord with the metadata of the parameter, the updating of the parameter.

The parameter may include at least one set value, and the updating of the parameter corresponds to the updating of the set value.

The method may further include, after updating the parameter, updating the metadata of the parameter equally to the metadata of the operating program.

The method may further include, if the metadata of the parameter is updated equally to the metadata of the operating program, executing the operating program.

The metadata of the operating program may include at least one of version information, update date information, and update time information of the operating program.

The metadata of the parameter may include at least one of update date information, and update time information of the parameter, and version information of the corresponding operating program.

In another embodiment, an electric vehicle includes: a metadata reading part reading at least one of metadata of an operating program for an ESA, and metadata of a parameter corresponding to the operating program; a comparing part comparing the metadata of the operating program with the metadata of the parameter; and an updating part updating the parameter according to the comparison result obtained in the comparing part.

The electric vehicle may further include, when as the comparison result of the comparing part, the metadata of the operating program accords with the metadata of the parameter, an operating program executing part executing the operating program.

The updating part may update the parameter when, as a result of comparison by the comparing part, the metadata of the operating program does not accord with the metadata of the parameter.

The parameter may include at least one set value, and the updating part updates the set value when updating of the parameter.

The updating part may update the metadata of the parameter equally to the metadata of the operating program when updating the parameter.

The electric vehicle may further include, when the updating part updates the metadata of the parameter equally to the metadata of the operating program, an operating program executing part executing the operating program.

The metadata of the operating program may include at least one of version information, update date information, and update time information of the operating program.

The metadata of the parameter may include at least one of version information, update date information, and update time information of the parameter, and version information of the operating program corresponding to the parameter.

The details of one or more embodiments are set forth in the accompanying drawings and the description below. Other features will be apparent from the description and drawings, and from the claims.

DETAILED DESCRIPTION OF THE EMBODIMENTS

In the following description, the technical terms are used only for explaining a specific exemplary embodiment while not limiting the present disclosure. The terms of a singular form may include plural forms unless referred to the contrary. The meaning of 'include' or 'comprise' specifies a property, a region, a fixed number, a step, a process, an element and/or a component but does not exclude other properties, regions, fixed numbers, steps, processes, elements and/or components.

Hereinafter, an electric vehicle related with the present disclosure will be described in more detail with reference to the accompanying drawings. As used herein, the suffixes 'module' and 'part are used for elements in order to facilitate the disclosure only. Therefore, significant meanings or roles are not given to the suffixes themselves and it is understood that the 'module' and 'part' may be used together or interchangeably.

Figure 1:
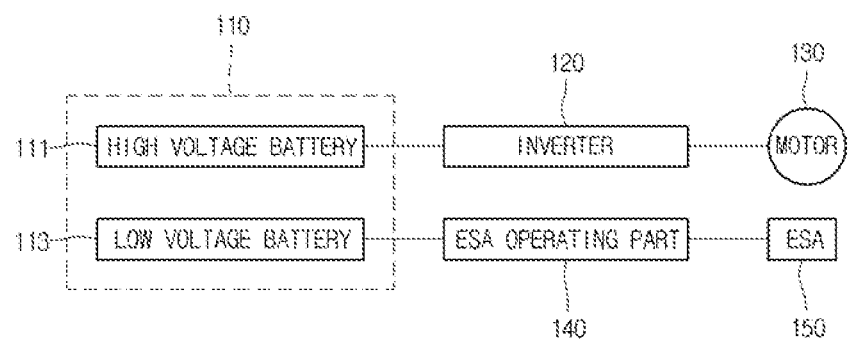
FIG. 1 is a block diagram showing a schematic configuration of an electric vehicle.

FIG. 1 is a block diagram showing a schematic configuration of an electric vehicle.

Referring to FIG. 1, an electric vehicle includes a battery 110, an inverter 120, a motor 130, an ESA operating part 140, and an ESA 150. Although FIG. 1 shows a schematic configuration of a typical electric vehicle, it will be apparent to those skilled in the art that the electric vehicle includes more many elements.

For the electric vehicle, the inverter 120 which is supplied with a driving power from the battery 110 controls the operation of the motor 130 according to a predetermined torque and velocity. Mechanical force transferred through a transmission (not shown) mechanically connected with the motor 130 allows the wheels of the electric vehicle to rotate.

For the electric vehicle, the ESA operating part 140 which is supplied with driving power from the battery 110 controls the operation of the ESA 150 according to a preset program.

Typically, the battery 110 in the electric vehicle includes a high voltage battery 111, which supplies driving power for driving high voltage parts such as the motor 130, the inverter 120, etc., and a low voltage battery 113, which supplies driving power for various ESAs provided in the electric vehicle.

The electric vehicle is provided with a plurality of electronic subassemblies 150, which include, for example, a low voltage DC-DC converter (LDC), a battery management system (BMS), an on-board charger (OBC), a vehicle radio, an instrument panel, etc. These electronic subassemblies 150 are normally operable by a hardware device constituting the ESA operating part 140, and a software program operating the hardware device. Hereinafter, a method of managing an operating program for electronic subassemblies will be described.

Figure 2:
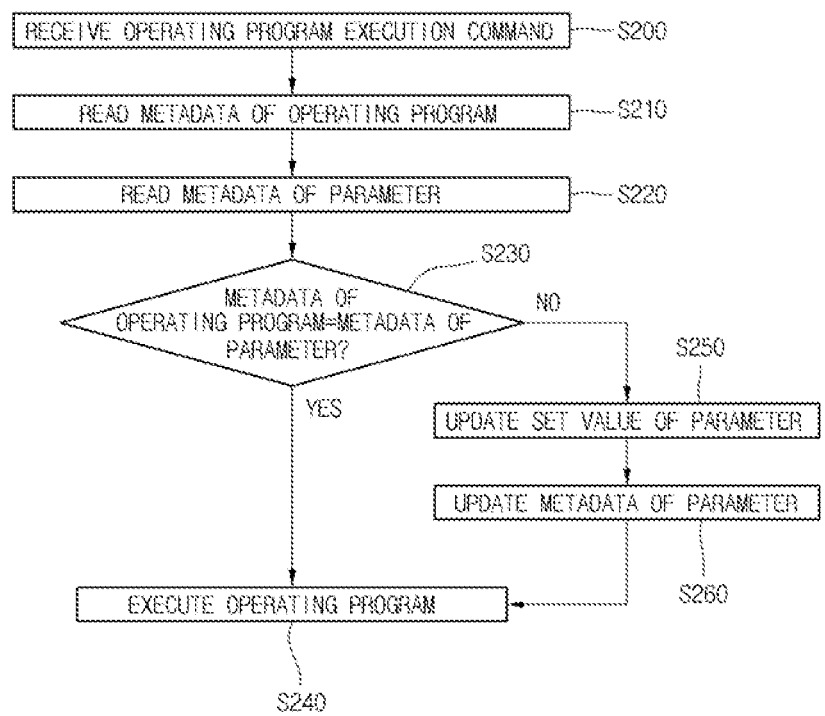
FIG. 2 is a flowchart for explaining a method of managing a program for an electric vehicle according to an embodiment.

FIG. 2 is a flowchart for explaining a method of managing a program for an electric vehicle according to an embodiment. The method of managing a program for an electric vehicle may be applied to an operating program for electronic subassemblies equipped in an electric vehicle. The operating program is first executed in the first operation of the electric vehicle, and then continuously updated for the improvement, change, and the like of functions. While the following description will be given to an example that a method of managing a program for an electric vehicle according to an embodiment is executed after the operating program has been updated several times, it will be apparent to those skilled in the art that the present disclosure is not limited thereto, but may be applied even to, in the case where the operating program is first operated (i.e., the case where the operating program is never updated), a timing when the operating program is updated.

Referring to FIG. 2, when receiving an execution command on the operating program for electronic subassemblies (S200), the ESA operating part 140 reads metadata added to the operating program (S210). In a state that a corresponding operating program is not executed or is executed, the ESA operating part 140 may operate as in operation S200, but its operation is not limited thereto. Herein, the metadata may include version information of the operating program, update date information, update time information, etc.

Thereafter, the ESA operating part 140 reads metadata of a parameter corresponding to the operating program (S220). Herein, the parameter indicates a variable referred by the operating program when the operating program is executed. The metadata of the parameter may include update date information of the parameter, update time information, version information of the operating program corresponding to the parameter, etc. Herein, the version information of the operating program corresponding to the parameter may indicate the version information of the operating program corresponding to the parameter stored at the present time. At this time, operation S210 and operation S220 may be processed regardless of their sequence, or may be processed at the same time.

The metadata of the operating program read in operation S210 is compared with the metadata of the parameter read in operation S220 (S230), and according to a comparison result, the parameter is updated or the execution of the operating program is continued.

That is, as a result of comparison in operation S230, when the metadata of the operating program accords with the metadata of the parameter, the ESA operating part 140 executes the operating program (S240).

As a result of comparison in operation S230, when the metadata of the operating program does not accord with the metadata of the parameter, the ESA operating part 140 updates the operating program (S250). The parameter may indicate a parameter operating in combination with the operating program which tries to execute at the present time. Herein, the parameter includes a plurality of set values, and the update of the parameter which is performed in operation S250 means the update of the set values. The set values indicate reference values for operation of the electronic subassemblies, for example, a maximum charge current value of the battery charged by the LDC, a voltage of each of the electronic subassemblies, a maximum value of current, a minimum value of current, etc.

When the update of the parameter is completed in operation S250, the ESA operating part 140 updates the metadata of the parameter with the metadata of the operating program read in operation S210 (S260).

When the update of the parameter (i.e., update of the set values) in operation S250 and the update of the metadata of the parameter in operation S260 are completed, the version of the operating program accords with the version of the parameter, and the operating program and the parameter have the corresponding combination.

Thus, when the update of the set values of the parameter and the metadata is completed and thus the metadata of the operating program accords with the metadata of the parameter, the ESA operating part 140 executes the operating program (S240).

Thus, by the method of managing a program for an electric vehicle according to an embodiment, an operating program error and a malfunction of electronic subassemblies which may be generated by the operating program referring to an inappropriate parameter can be prevented.

Figure 3:
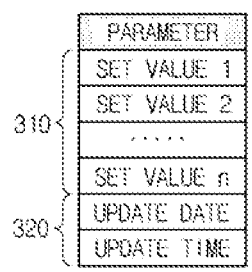
FIG. 3 is a schematic view for explaining parameters corresponding to an operating program for ESA.

FIG. 3 is an exemplary view for explaining a parameter corresponding to an operating program for electronic subassemblies, in which information included in the parameter is schematically shown.

Referring to FIG. 3, areas where the parameter is stored may be classified into an area where a plurality of set values 310 are stored, and an area where metadata 320 is stored.

The plurality of set values 310 indicate reference values for operation of corresponding electronic subassemblies, as described above.

The metadata 320 of the parameter indicates update date information of the parameter, update time information, version information of the operating program corresponding to the parameter, or the like, and the version information of the operating program corresponding to the parameter may indicate the version of the operating program operating in combination with the set values 310 stored at the present time.

In the method of managing a program for an electric vehicle according to an embodiment, when the metadata of the operating program which tries to execute does not accord with the metadata of the parameter stored at the present time, the parameter stored at the present time is updated. At this time, the respective set values 310 included in the parameter are updated with the set values corresponding to the operating program. When the update of the set values 310 is completed, the metadata 320 of the parameter is updated equally to the metadata of the operating program. Therefore, in the next execution of the same operating program, if the operating program is not updated again, since the metadata of the operating program accords with the metadata of the parameter stored at the present, an update of the parameter is not performed but the execution of the operating program is continued. Thus, since the update of the parameter is accompanied by the update of the parameter, errors caused by a difference in version information between the operating program and the parameter can be prevented to thus enhance the reliability of the operating program for electronic subassemblies.

Figure 4:
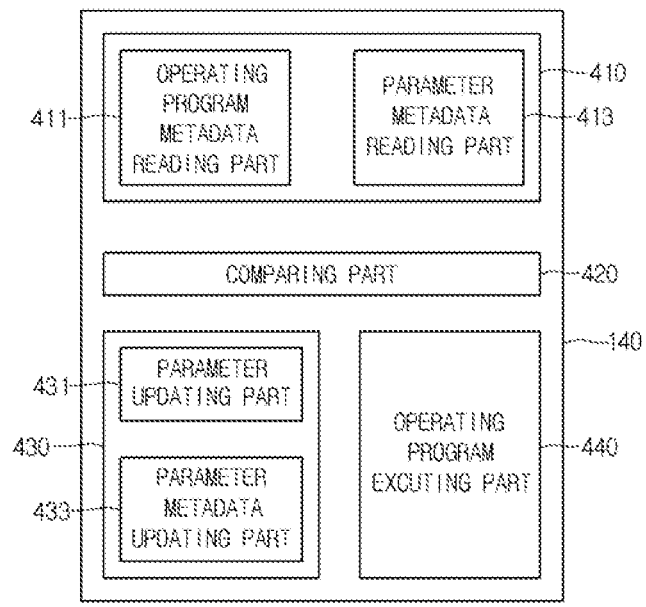
FIG. 4 is a schematic view of an electric vehicle according to an embodiment.

FIG. 4 is a block diagram of an electric vehicle according to an embodiment. Hereinafter, description on contents overlapping the above-described contents will be omitted.

Referring to FIG. 4, the ESA operating part 140 includes a metadata reading part 410, a comparing part 420, an updating part 430, and an operating program executing part 440.

The metadata reading part 410 includes an operating program metadata information reading part 411, and a parameter metadata reading part 413. When the ESA operating part 140 receives a command for executing an operating program for an electronic subassembly, the operating program metadata reading part 411 reads metadata added to the operating program, and the parameter metadata reading part 413 reads metadata of a parameter.

The comparing part 420 compares operating program metadata information read by the operating program metadata reading part 411 with parameter metadata read by the parameter metadata reading part 413. When the metadata of the operating program does not accord with the metadata of the parameter, the comparing part 420 may transmit comparison results to the updating part 430. When the metadata of the operating program accords with the metadata of the parameter, the comparing part 420 may transmit comparison results to the program executing part 440.

The updating part 430 includes a parameter updating part 431, and a parameter metadata updating part 433. When receiving a result that the metadata of the operating program transmitted from the comparing part 420 does not accord with the metadata of the parameter, the parameter updating part 430 may update the parameter including a plurality of set values. When receiving a parameter update result transmitted from the parameter updating part 430, the parameter metadata updating part 433 may update the parameter metadata with the operating program metadata read by the operating program metadata reading part 411.

When information that the metadata of the operating program accords with the metadata of the parameter is transmitted from the comparing part 420 or the updating part, the operating program executing part 440 executes the operating program. For example, when the version of the operating program accords with the version of the parameter referred by the operating program, the operating program executing part 440 may execute the operating program.

The present disclosure can prevent errors that may be generated by the ESA operating program referring to an inappropriate parameter, and malfunction of electronic subassemblies by adding metadata to the parameter referred by the ESA operating program to determine update history and automatically updating the parameter according to the update of the operating program.

Although embodiments according to the present disclosure have been described, it should be understood that numerous other modifications and embodiments can be devised by those skilled in the art that will fall within the spirit and scope of the principles of this disclosure. Therefore, the scope of the present disclosure should be defined by the appended claims and equivalents thereof.

What is claimed is:

1. A method of updating an electric vehicle, the method comprising:

obtaining operating metadata of a first parameter of an operating program for an electronic subassembly of the electric vehicle, the operating metadata including an update time and an update date of the first parameter of the operating program, and wherein the first parameter comprises a first value that was updated at the update time and the update date of the first parameter;

obtaining parameter metadata of a second parameter that corresponds to the first parameter of the operating program, the parameter metadata including an update time and an update date of the second parameter, and wherein the second parameter comprises a second value that was updated at the update time and the update date second parameter;

updating the update time, the update date, and the second value of the second parameter of the parameter metadata respectively with the update time, the update date, and the first value of the first parameter of the operating metadata when the operating metadata of the first parameter is not equal to the parameter metadata of the second parameter; and executing the operating program when the operating metadata of the first parameter is equal to the parameter metadata of the second parameter.

2. The method according to claim 1, wherein the first parameter and the second parameter each comprise one of a maximum charge amount of a battery of the electric vehicle, a minimum charge amount of the battery, a voltage of a subassembly of the electric vehicle, a maximum value of current associated with the electric vehicle, or a minimum value of current associated with the electric vehicle.

3. The method according to claim 1, further comprising executing the operating program after the updating.

4. The method according to claim 1, wherein the operating metadata comprises version information of the operating program.

5. The method according to claim 1, wherein the parameter metadata comprises version information of the operating program.

6. An electric vehicle comprising:
a hardware metadata reader configured to:
obtain operating metadata of a first parameter of an operating program for an electronic subassembly of the electric vehicle, the operating metadata including an update time and an update date of the first parameter of the operating program, and wherein the first parameter comprises a first value that was updated at the update time and the update date of the first parameter;
obtain parameter metadata of a second parameter that corresponds to the first parameter of the operating program, the parameter metadata including an update time and an update date of the second parameter, and wherein the second parameter comprises a second value that was updated at the update time and the update date second parameter;

a hardware updater configured to update the update time, the update date, and the second value of the second parameter of the parameter metadata respectively with the update time, the update date, and the first value of the first parameter of the operating metadata when the operating metadata of the first parameter is not equal to the parameter metadata of the second parameter; and a hardware executer configured to execute the operating program when the operating metadata of the first parameter is equal to the parameter metadata of the second parameter.

7. The electric vehicle according to claim 6, wherein the first parameter and the second parameter each comprise one of a maximum charge amount of a battery of the electric vehicle, a minimum charge amount of the battery, a voltage of a sub-assembly of the electric vehicle, a maximum value of current associated with the electric vehicle, or a minimum value of current associated with the electric vehicle.

8. The electric vehicle according to claim 6, wherein the hardware executer is further configured to execute the operating program after the parameter metadata is updated.

9. The electric vehicle according to claim 6, wherein the operating metadata comprises version information of the operating program.

10. The electric vehicle according to claim 6, wherein the parameter metadata comprises version information of the operating program.

* * * * *